Figure 3:
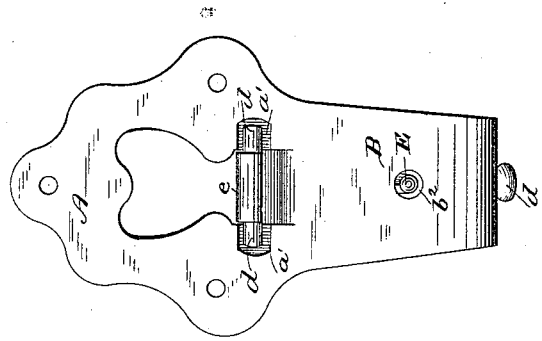

(No Model.)

G. ELBEL.
TRACE CHAIN CARRIER.

No. 348,196. Patented Aug. 31, 1886.

WITNESSES
Chas. R. Burr
J. S. Barker

INVENTOR
Gustavus Elbel
Doubleday & Bliss
Attorneys

UNITED STATES PATENT OFFICE.

GUSTAVUS ELBEL, OF CANTON, OHIO.

TRACE-CHAIN CARRIER.

SPECIFICATION forming part of Letters Patent No. 348,196, dated August 31, 1886.

Application filed August 9, 1884. Serial No. 140,128. (No model.)

*To all whom it may concern:*

Be it known that I, GUSTAVUS ELBEL, a citizen of the United States, residing at Canton, in the county of Stark and State of Ohio, have invented certain new and useful Improvements in Trace-Carriers, of which the following is a specification, reference being had therein to the accompanying drawings.

My invention relates to a novel device for holding the trace-chains of harness, as particularly described and pointed out in the following description and claims, and as illustrated in the drawings, in which—

Figure 2:
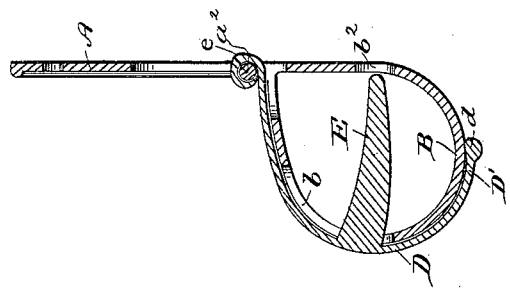
Figure 1:
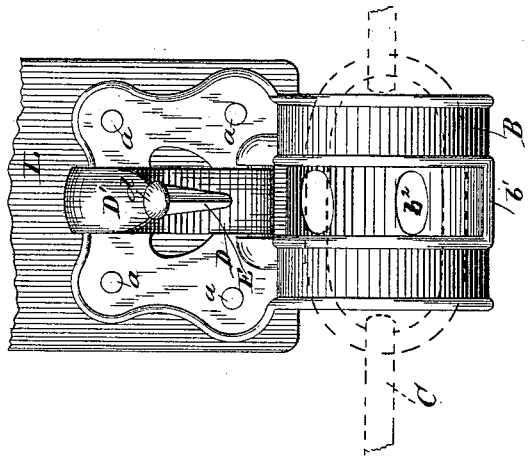

Figure 1 is a front view of the holder, the tongue being elevated. Fig. 2 is a sectional view showing the position of the parts when in use. Fig. 3 is a rear view.

My trace-holder may be attached to any convenient or preferred part of the harness. I have shown it attached to a detached piece of leather, L.

A represents a plate, which is secured to the harness by means of rivets $a\ a$.

B is a loop extending downwardly from said plate, and through which the trace-chain C is passed.

D is a tongue, hinged to plate A upon a line just above where the loop joins plate A. The upper or inner end of this tongue may be provided upon its opposite edges with short arms or pins $d$, which are seated in recesses $a'$ in plate A, thus forming a hinge of a well-known character; or the plate A may be provided with a bar, $a^2$, which is encircled by a loop on the upper end of the tongue D. The tongue D is curved so that when it is forced down it will coincide with the outer face of the loop B.

E is a tooth or spur projecting from the inner or concave face of the tongue, and adapted to pass through a slot, $b$, in the loop when it is forced down, and enter the link of the chain lying within the loop, thus securely holding it from accidental withdrawal.

By making the tongue (consisting of the parts D and E) of the hook shape or form shown and by hinging it upon the outside of the loop B, I provide that when the tongue is thrown upwardly it lies entirely outside of the loop and leaves that unobstructed for the entrance or withdrawal of the trace-chains, while when the tongue is thrown down the spur or tooth E, which engages with the trace, enters the loop from the outside and lies transversely across it, the line of travel of the tooth while entering or being withdrawn from the loop being substantially in the direction of the length of the tooth, whereby the spur E may be swung even when the chain is drawn tight, a capability which is very desirable, and which, I believe, I am the first to produce.

My trace-holder is of that class employing a loop which confines and supports the trace-chain at all times, whether the animal be hitched to the vehicle or not; and the form and arrangement of the retaining-tongue enables me to have the tooth E enter the loop point first and travel across the loop and the line of the trace in substantially the direction of its length, thereby avoiding the necessity of slackening the chain as has heretofore been required in trace-holders having confining-loops and a swinging tongue adapted to engage with the trace.

I am aware that trace-holders adapted to hold the traces when they are unhitched from the vehicle, consisting of plates attached to the harness, and having curved hooks adapted to engage with the cockeyes or links of the trace, are old, and I do not claim such a device; but my trace-holder differs from this class of trace-holders in employing a confining-loop in combination with a hinged tongue so mounted that it may engage with the trace without requiring it to be slackened. The upper or inner end of the tongue is formed with a cam or eccentric projection, $e$, which, by reason of its engagement with the strap L, serves to hold the tongue either in an elevated position or down in contact with loop B, as may be desired, these being the only two positions which it is desired the tongue should occupy.

To further assist in holding down the tongue in engagement with the chain, I provide the outer end, D', of the tongue with a small knob or enlargement, $d$, which passes over a rib, $b'$, upon the loop, thus serving as a lock to hold the parts against accidental displacement; or I may dispense with the rib $b'$ and make the tongue so long that the knob shall pass the part of the circumference of the loop farthest from the axial line of the tongue, when it will lock the parts in place. The loop may be slotted at $b$ to any desired extent, and I usually prefer to provide the rear wall of the loop with an aperture, $b^2$, to receive the point of the spur E.

I do not wish to be limited to forming the tongue with the outer arm, D', which carries the knob $d$, as the holder will operate advantageously without such part of the tongue; but I prefer to retain it, because it operates as an additional lock to hold down the tongue, and also makes a neater appearing holder, as it conceals the aperture or slot $b$. It will be seen that both the cam $e$ and the knob on the tongue D act as friction-stops to prevent accidental displacement of the tongue when in engagement with the chain, and while I prefer to use them together, as I have shown and described, still either one may be used advantageously without the other.

I do not in this case claim any of the subjects-matter respectfully set forth in the claims of my other application No. 166,284, filed May 21, 1885, I preferring in this case to restrict myself to claims based upon a trace-chain holder having a loop with a passage in its outer wall, and a hinged tongue having an end or point adapted to pass endwise through said passage into the loop; secondly, the combination, with the loop, of a hinged fastener carrying a chain-engaging spur, and having a cam or eccentric to engage with a harness-strap; thirdly, to the combination, with a loop, of a hinged tongue having a chain-engaging spur, and also having an arm provided with a catch-knob; and, fourthly, the combination, with a loop provided with a slot through its outer wall, and a rib—such as at $b'$—on said wall, of the hinged tongue having a spur to pass through the said slot, and an arm having a knob which can engage with the aforesaid rib at $b'$—that is to say, I prefer to consider this case as specific with reference to my other pending application aforesaid and disclaim herein the matters therein claimed.

What I claim is—

1. The herein-described trace-chain holder, consisting of plate A, loop B, slotted in its outer face, adapted to hold a trace-chain, and a curved tongue hinged to the holder and adapted to engage with the chain in said loop, which tongue when raised lies entirely outside of the loop, and when brought down enters the loop point first and in substantially the direction of its length, as described.

2. The combination, with the trace-chain holder having the back plate, A, and the loop B, provided with a slot or aperture in its front wall, of a fastener united by a hinge-connection with the aforesaid parts, and carrying a spur or pin, E, arranged, substantially as set forth, to move endwise into and out from the loop through the said aperture or slot, and said fastener having at its hinged end a cam or eccentric, $e$, projecting through plate A, and adapted to engage with a harness-strap to which the holder is attached, substantially as set forth.

3. In combination with the trace-holder consisting of the plate A and loop B, the tongue D, hinged to said holder, and having the spur E, adapted to lie across the loop, and the arm D', carrying the knob $d$, substantially as set forth.

4. The combination of the plate A, the loop B, provided with slot $b$ and rib $b'$, and the tongue hinged to plate A, and having a spur, E, which enters the slot $b$ and lies across the loop, and the arm D', carrying a knob, $d$, adapted to pass over the rib $b'$ and lock said tongue in contact with the loop, substantially as set forth.

In testimony whereof I affix my signature in presence of two witnesses.

GUSTAVUS ELBEL.

Witnesses:
 CHAS. P. DUFF,
 HENRY FISHER.